(12) United States Patent  
Gonze et al.

(10) Patent No.: US 8,118,908 B2  
(45) Date of Patent: Feb. 21, 2012

(54) ELECTRICALLY HEATED PARTICULATE MATTER FILTER WITH RECESSED INLET END PLUGS

(75) Inventors: Eugene V. Gonze, Pinckney, MI (US); Frank Ament, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 588 days.

(21) Appl. No.: 12/106,594

(22) Filed: Apr. 21, 2008

(65) Prior Publication Data

US 2009/0229467 A1   Sep. 17, 2009

Related U.S. Application Data

(60) Provisional application No. 61/037,181, filed on Mar. 17, 2008.

(51) Int. Cl.
*B01D 46/00* (2006.01)

(52) U.S. Cl. ............... 95/18; 55/282.3; 55/283; 55/523; 55/DIG. 10; 55/DIG. 30; 95/278

(58) Field of Classification Search .................. 55/385.3, 55/523, 524, DIG. 10, DIG. 30, 309; 95/278; 60/311, 295, 274, 286, 297, 300, 303; 422/177, 422/178, 180; 428/116

See application file for complete search history.

(56) References Cited

U.S. PATENT DOCUMENTS

| 4,505,726 | A | 3/1985 | Takeuchi |
| 4,516,993 | A | 5/1985 | Takeuchi |
| 4,519,820 | A * | 5/1985 | Oyobe et al. ............... 55/284 |
| 6,461,398 | B2 * | 10/2002 | Peters et al. ............... 55/523 |
| 6,694,727 | B1 * | 2/2004 | Crawley et al. ............. 60/295 |
| 6,709,489 | B2 * | 3/2004 | Ament et al. ............... 95/278 |
| 6,790,248 | B2 * | 9/2004 | Ishihara et al. ............. 55/309 |
| 7,107,763 | B2 * | 9/2006 | Suwabe et al. ............. 60/295 |
| 7,469,532 | B2 * | 12/2008 | Williamson et al. ......... 60/295 |
| 7,497,889 | B2 * | 3/2009 | Furukawa et al. ........... 55/523 |
| 7,578,864 | B2 * | 8/2009 | Watanabe et al. ........... 55/523 |

* cited by examiner

*Primary Examiner* — Duane Smith  
*Assistant Examiner* — Minh-Chau Pham

(57) ABSTRACT

A particulate matter (PM) filter includes filter walls having inlet ends and outlet ends. First adjacent pairs of the filter walls define inlet channels. Second adjacent pairs of the filter walls define outlet channels. Outlet end plugs are arranged in the inlet channels adjacent to the output ends. Inlet end plugs arranged in the outlet channels spaced from the inlet ends.

16 Claims, 9 Drawing Sheets

ELECTRICALLY HEATED PARTICULATE MATTER FILTER WITH RECESSED INLET END PLUGS

CROSS-REFERENCE TO RELATED APPLICATIONS

This application claims the benefit of U.S. Provisional Application No. 61/037,181, filed on Mar. 17, 2008, which is incorporated herein by reference in its entirety.

STATEMENT OF GOVERNMENT RIGHTS

This invention was produced pursuant to U.S. Government Contract No. DE-FC-04-03 AL67635 with the Department of Energy (DoE). The U.S. Government has certain rights in this invention.

FIELD

The present disclosure relates to particulate matter (PM) filters.

BACKGROUND

The background description provided herein is for the purpose of generally presenting the context of the disclosure.

Diesel engines combust fuel in the presence of air to produce power. The combustion of fuel produces exhaust gas that contains particulate matter (PM). The PM may be filtered from the exhaust gas using a PM filter. Over time, the PM may accumulate within the PM filter and may restrict the flow of exhaust gas through the PM filter. PM that has collected within the PM filter may be removed by a process referred to as regeneration. During regeneration, PM within the PM filter may be combusted.

Regeneration may involve heating the PM filter to a combustion temperature of the PM. There are various ways to perform regeneration including modifying engine management, using a fuel burner, using a catalytic oxidizer to increase the exhaust temperature with after injection of fuel, using resistive heating coils, and/or using microwave energy.

Diesel PM combusts when temperatures above a combustion temperature such as 600° C. are attained. The start of combustion causes a further increase in temperature. Once the PM is ignited, the burning PM may be used to regenerate the rest of the filter. In other words, cascading flame front moves from the inlet to the outlet of the PM filter. While spark-ignited engines typically have low oxygen levels in the exhaust gas stream, diesel engines have significantly higher oxygen levels. While the increased oxygen levels make fast regeneration of the PM filter possible, it may also pose some problems.

Figure 1:
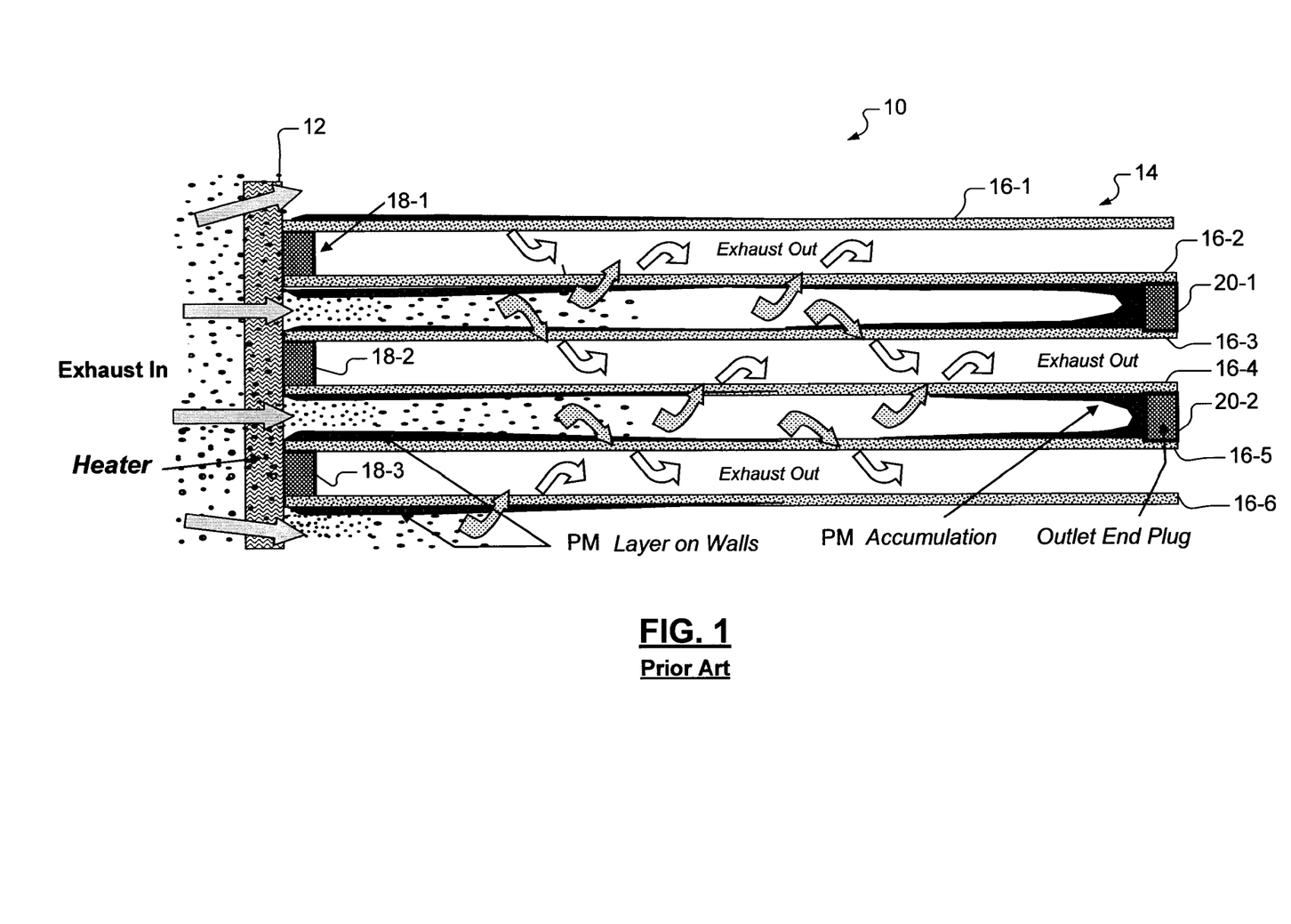
FIG. 1 is a side cross-sectional view of a PM filter assembly according to the prior art.

Referring now to FIG. 1, a PM filter system 10 for regenerating a PM filter is shown. The PM filter system 10 includes a heater 12. The PM filter system 10 further includes a particular matter filter 14 that includes walls 16-1, 16-2, ..., and 16-6 (collectively walls 16). Some pairs of the adjacent walls 16 define outlet channels and may include an inlet end plug. Other pairs of adjacent walls define inlet channels and may include an outlet end plug.

In particular, adjacent walls 16-1 and 16-2, 16-3 and 16-4, and 16-5 and 16-6 define outlet channels and include an inlet end plugs 18-1, 18-2, and 18-3, respectively (collectively inlet end plugs 18). Adjacent walls 16-2 and 16-3, 16-4 and 16-5 include define inlet channels and include outlet end plugs 20-1 and 20-2, respectively (collectively outlet end plugs 20).

In use, exhaust flows through the heater 12 and into inlet channels of the filter 14. The exhaust flows from the inlet channels through the walls 16 into adjacent outlet channels. PM is filtered as the exhaust gas passes through the walls 16 and builds up on the walls 16 in the inlet channels. PM also builds up in the inlet channels in areas around the outlet end plugs 20.

Figure 2:
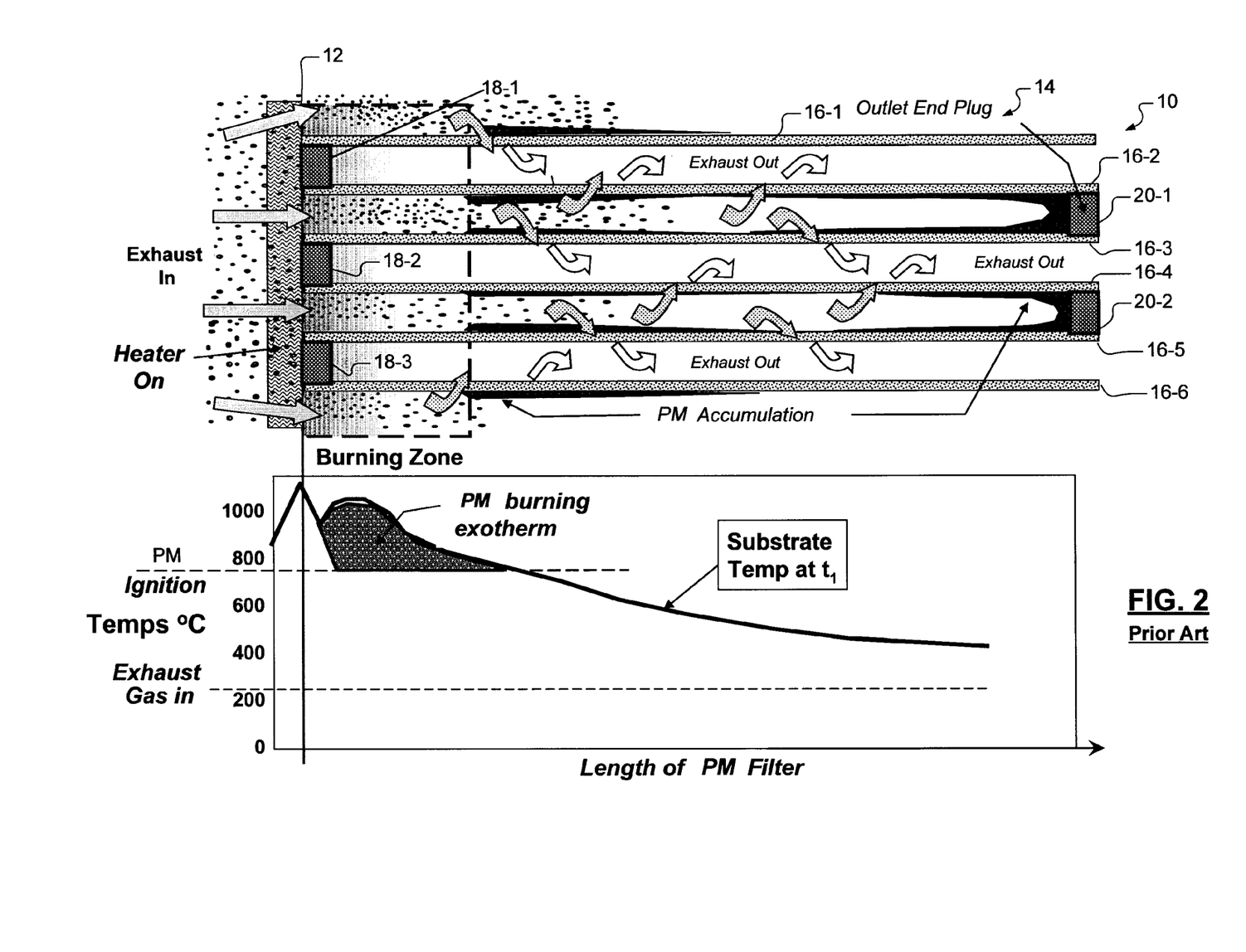
FIG. 2 is a side cross-sectional view of the PM filter of FIG. 1 and a graph of regeneration temperature during a first period after regeneration begins.
Figure 3:
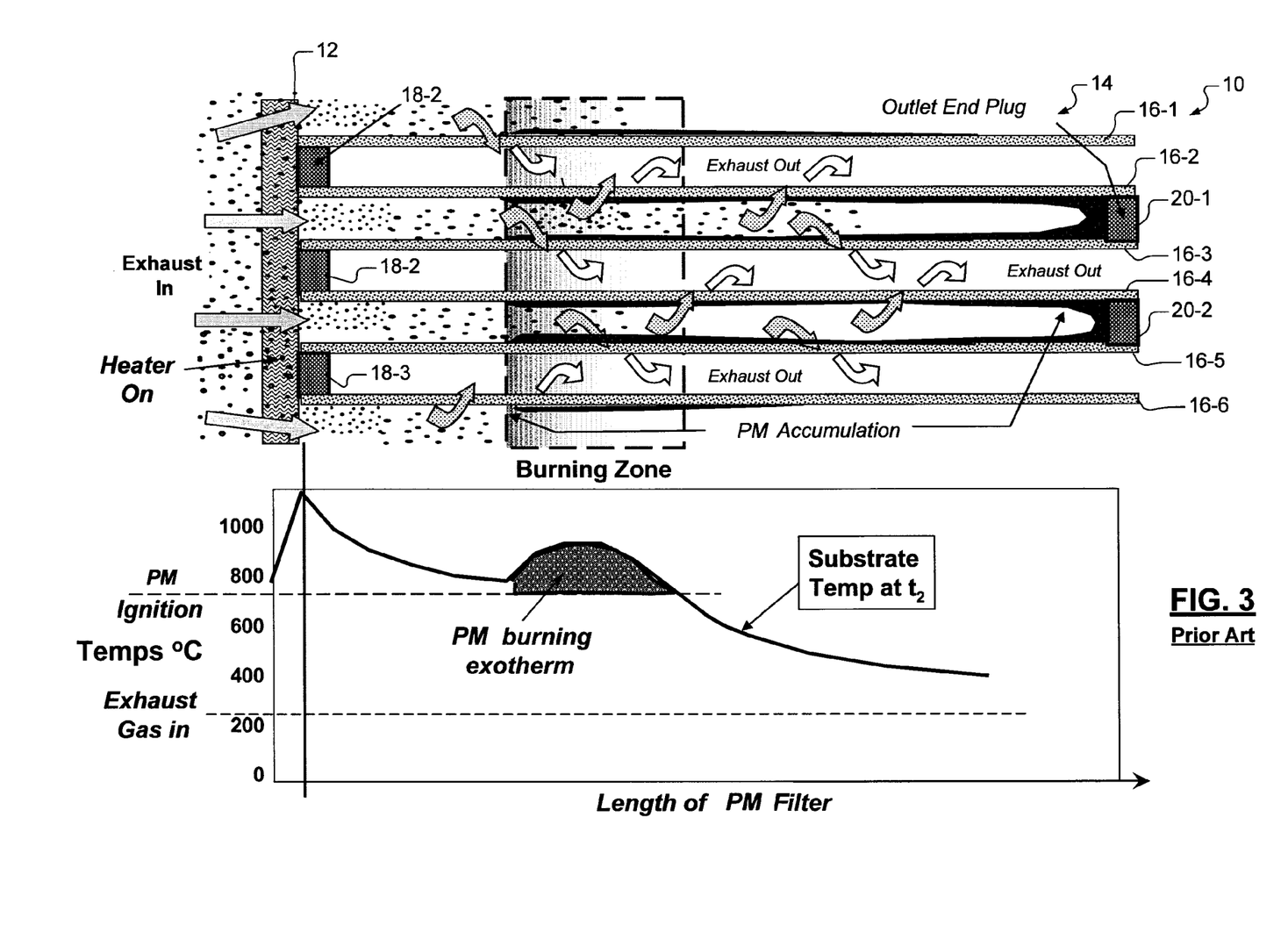
FIG. 3 is a side cross-sectional view of the PM filter of FIG. 1 and a graph of regeneration temperature during a second period after regeneration begins.
Figure 4:
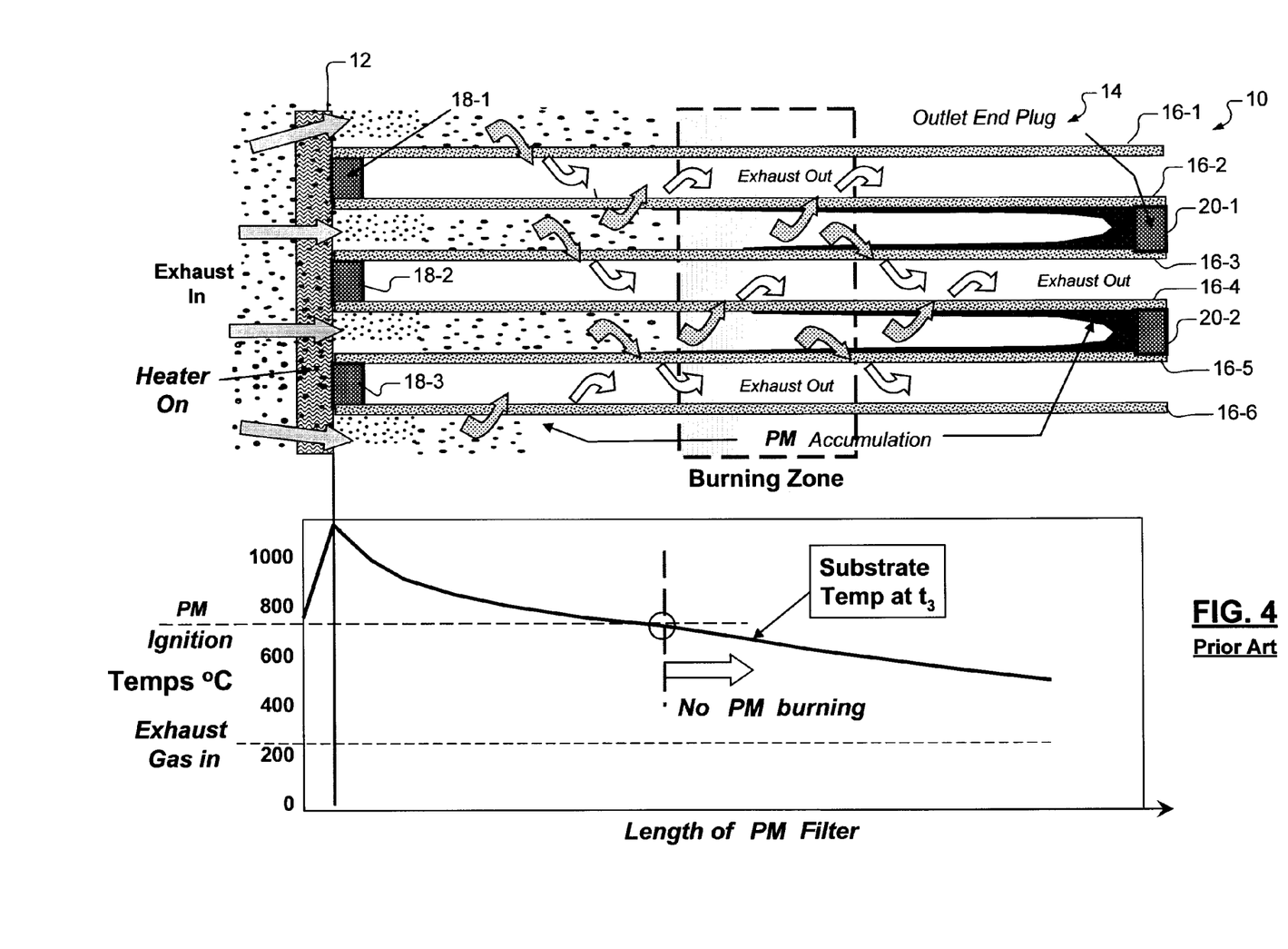
FIG. 4 is a side cross-sectional view of the PM filter of FIG. 1 and a graph of regeneration temperature during a third period after regeneration begins.

Referring now to FIGS. 2-4, regeneration within the PM filter system 10 is shown. In FIG. 2, when the heater 12 is turned on, PM adjacent to the heater begins burning in a burning zone. The substrate temperature in areas beyond the burning zone may be less than the PM ignition temperature. Therefore, there is no regeneration in these areas at this time.

In FIG. 3, the burning zone moves along the length of the PM filter 14. Regeneration of the PM continues as long as the burning zone temperature is above the PM ignition temperature. In FIG. 4, if the burning zone temperature falls below the PM ignition temperature, the filter 14 will not be regenerated fully. In other words, PM may remain in portions of the filter 14 that are adjacent to the outlet end plugs 20.

To avoid this situation, the heater 12 may be turned on to heat the PM filter to a higher initial temperature. The higher temperatures may tend to decrease the durability of the PM filter.

SUMMARY

A particulate matter (PM) filter includes filter walls having inlet ends and outlet ends. First adjacent pairs of the filter walls define inlet channels. Second adjacent pairs of the filter walls define outlet channels. Outlet end plugs are arranged in the inlet channels adjacent to the output ends. Inlet end plugs arranged in the outlet channels spaced from the inlet ends.

In other features, the exhaust flows into the inlet channels, through the filter walls of the inlet channels to the outlet channels. Exhaust also flows into portions of the outlet channels between the inlet ends of the walls and the inlet end plugs. PM builds up in the portions during operation.

A system comprises the PM filter and further comprises a heater that is arranged adjacent to the inlet ends of the filter walls. A control module selectively activates the heater to regenerate the PM filter.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements.

The present disclosure describes systems and methods for improving the regeneration of front-heated, wall-flow PM filters. The PM filter according to the present disclosure uses recessed inlet end plugs to localize and increase PM accumulation in these areas. The accumulated PM improves the regeneration of the PM filter.

The successful regeneration of front-heated PM (PM) filters depends on the amount of heat applied to an inlet of a wall-flow substrate. The peak temperature will determine if PM light-off is initiated. The amount of thermal mass will determine if the regeneration process will proceed down the entire substrate length. In other words, the heat applied to the inlet of the PM Filter is based on (exhaust heat) plus (localized PM exothermic heat) plus (any external heat source).

Recessed inlet end plugs according to the present disclosure provide for PM accumulation at the inlet end of the PM filter adjacent to the heater element. This accumulation increases the localized PM exothermic heat at the inlet compared to non-recessed inlet end plugs. The increased energy can increase the likelihood that the burn-off propagates down the length of the PM Filter. This approach may tend to reduce the amount of heat supplied by the heater.

In other words, heat applied to the inlet of the PM filter is based on (exhaust heat (which is the same as in FIG. 1)) plus (localized PM exothermic heat (which is increased due to the accumulated PM in the recessed inlet end plugs)+(external heat (which can be decreased)).

As can be appreciated, the external heat may be supplied by any suitable method. For example only, heat can be supplied by modifying engine management, using a fuel burner, using a catalytic oxidizer to increase the exhaust temperature with after injection of fuel, using resistive heating coils, and/or using microwave energy. The resistive heating coils may be zoned or unzoned.

Figure 5:
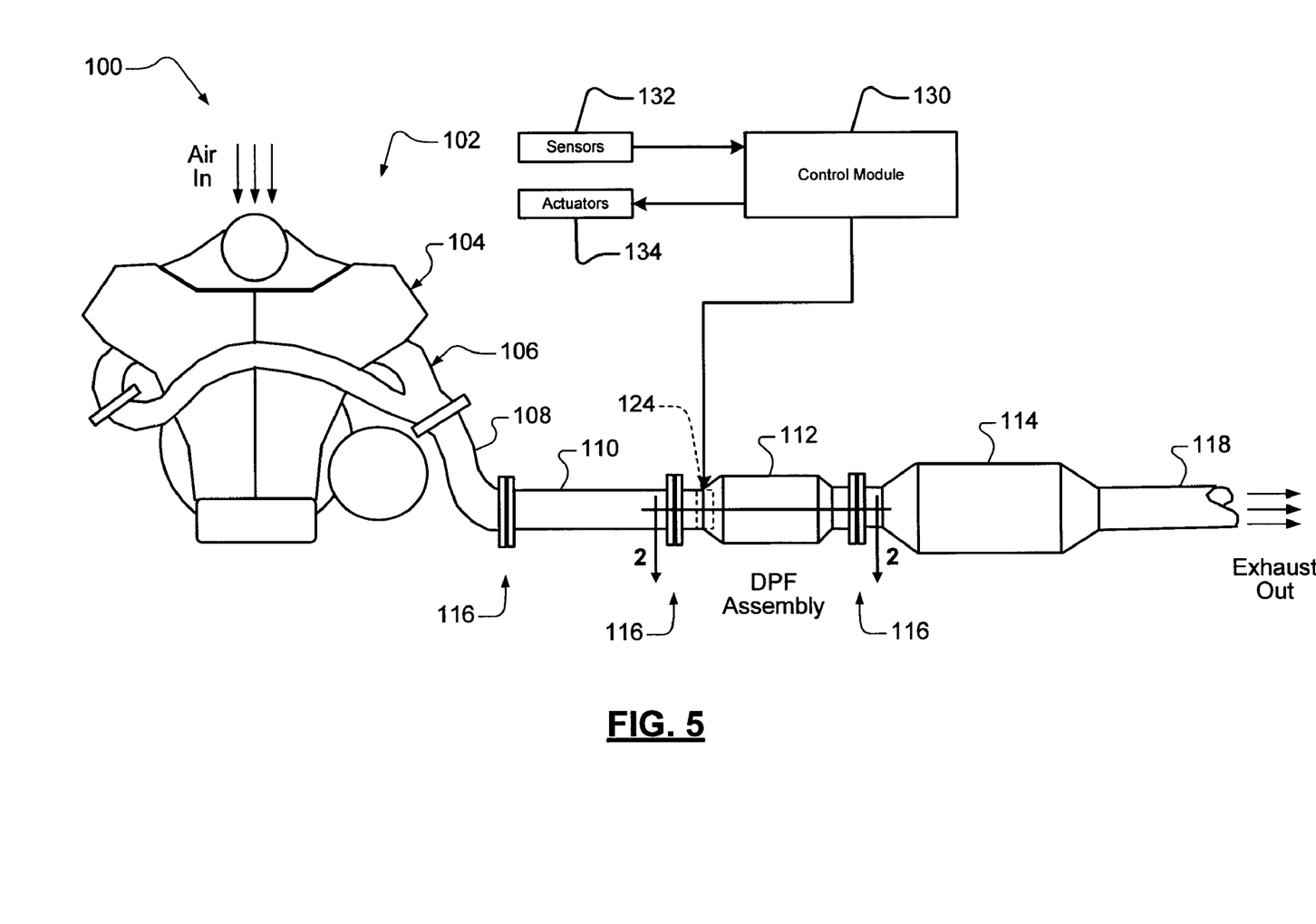
FIG. 5 is a functional block diagram of an exemplary engine and exhaust system according to the present disclosure.

In FIG. 5, a functional block diagram of an exemplary engine and exhaust system 100 for a vehicle is shown. The engine and exhaust system 100 may include a diesel engine system 102. While diesel engine system 102 is shown, the present disclosure is applicable to gasoline engine systems, homogenous charge compression ignition engine systems, and/or other engine systems.

The diesel engine system 102 includes an engine 104 and an exhaust system 106. The engine 104 combusts a mixture of air and diesel fuel to produce power (e.g., torque). The combustion of the air and fuel mixture produces exhaust gas that may be expelled from the engine 104 into the exhaust system 106. The exhaust gas produced by the engine 104 may contain a mixture of gaseous compounds and PM that enters the exhaust system and may be treated therein prior to exiting the exhaust system 106.

The exhaust system 106 may include an exhaust manifold assembly 108, an intermediate pipe assembly 110, a PM filter assembly 112, and a muffler assembly 114. The PM filter assembly may include heater 124 that may be used to increase the heat of the PM filter during regeneration.

Exhaust gas produced by the engine 104 flows through the exhaust manifold assembly 108 to the PM filter assembly 112 via the intermediate pipe assembly 110. Exhaust gas exiting the PM filter assembly 112 flows through the muffler assembly 114 and is released to the atmosphere through a tailpipe 118. The intermediate pipe assembly 110 may include exhaust gas aftertreatment systems, such as but not limited to, a diesel oxidation catalyst (DOC) assembly and a selective catalytic reduction (SCR) assembly.

The PM filter assembly 112 filters PM from the exhaust gas flowing through the PM filter assembly 112. PM may accumulate within the PM filter assembly 112 during a process referred to as loading and thereby restrict the flow of exhaust gas through the PM filter assembly 112. PM that has accumulated within the PM filter assembly 112 may be removed by regeneration. During regeneration, heat is used to combust the PM present in the PM filter assembly 112.

The vehicle may include a control module 130 that monitors sensors 132 such as intake air temperature (IAT), manifold absolute pressure (MAP), mass air flow (MAF), engine speed, coolant temperature, throttle position, and other parameters. The control module 130 adjusts actuators 134 such as an ignition system, an electric throttle, a fuel injection system, and other engine systems. The control module 130 may also determine when the PM filter requires regeneration and actuate the heater 124.

Figure 6:
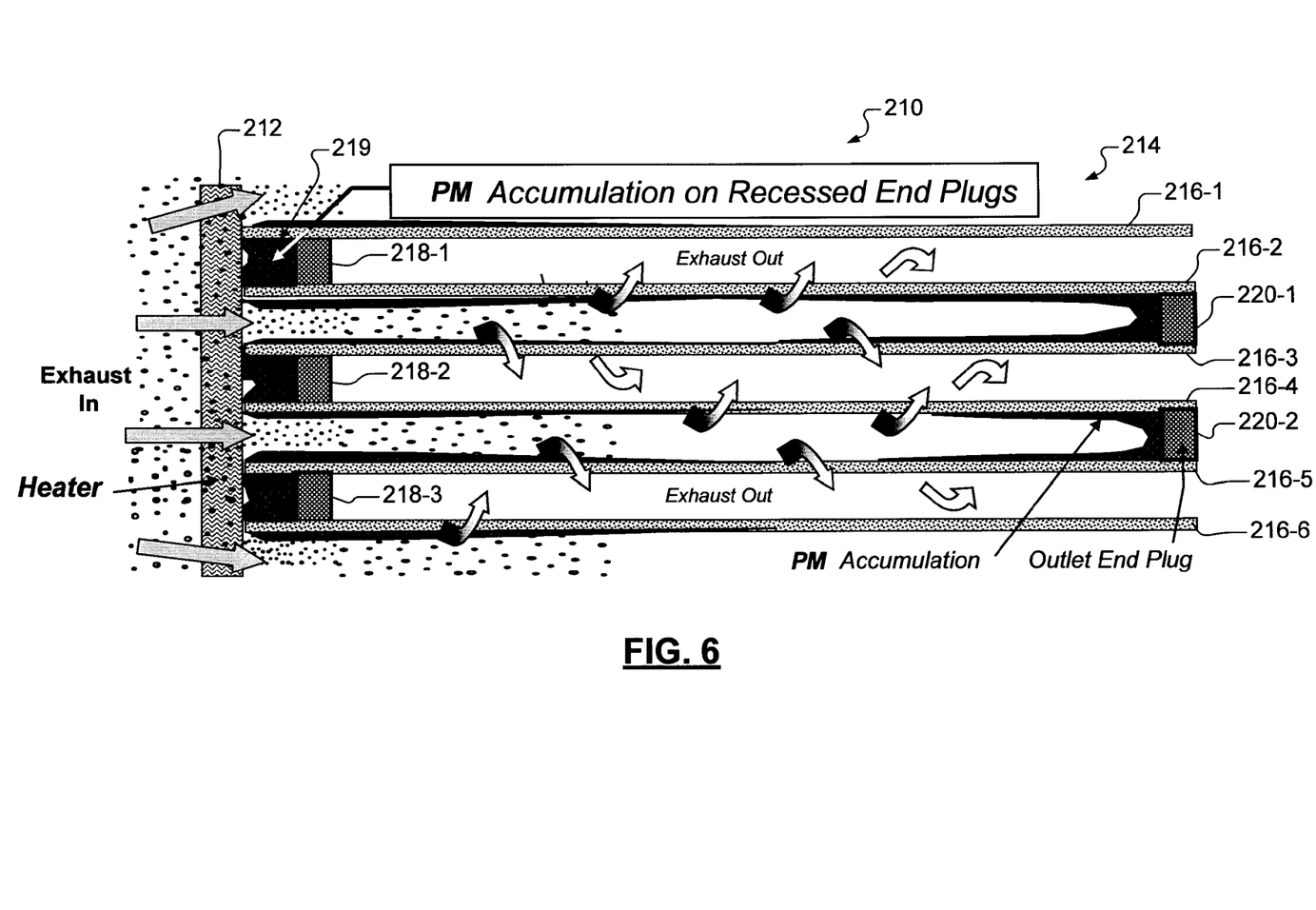
FIG. 6 is a side cross-sectional view of a PM filter assembly with recessed inlet end plugs according to the present disclosure.

Referring now to FIG. 6, a PM filter assembly 210 for regenerating a PM filter is shown. The PM filter assembly 210 includes a heater 212. For example only, the heater 212 may include a resistive heater. The heater may be turned on and off by the control module. The PM filter assembly 210 further includes a PM filter 214 that includes walls 216-1, 216-2, ..., and 216-6 (collectively walls 216). The walls 216 may be arranged adjacent and generally parallel to each other.

In particular, adjacent walls 216-1 and 216-2, 216-3 and 216-4, and 216-5 and 216-6 define outlet channels and include recessed inlet end plugs 218-1, 218-2, and 218-3, respectively (collectively recessed inlet end plugs 18). Adjacent walls 216-2 and 216-3, 216-4 and 216-5 define inlet channels and include outlet end plugs 220-1 and 220-2, respectively (collectively outlet end plugs 220). The recessed inlet end plugs 18 may be recessed from the inlet ends of the walls 216 by any suitable distance to achieve a desirable amount of PM buildup during a desired regeneration interval. The distance may be limited in part by the corresponding reduction in wall area available for the exhaust gas to transition from the inlet channel to the outlet channel.

In use, exhaust flows through the heater 212 and into inlet channels formed by walls 216 that do not have recessed inlet end plugs 218. In addition, exhaust flows into portions 219 of the outlet channels formed by walls 216 that have recessed inlet end plugs 218. As a result, PM accumulates in the portions 219 of the outlet channels.

The exhaust gas flows from the inlet channels into adjacent outlet channels. The exhaust gas also flows into the portions 219 of the outlet channels and then into the inlet channels. PM is filtered as the exhaust passes through the walls 216 and builds up on the walls 216. PM also builds up in areas around the outlet end plugs 220.

Figure 7:
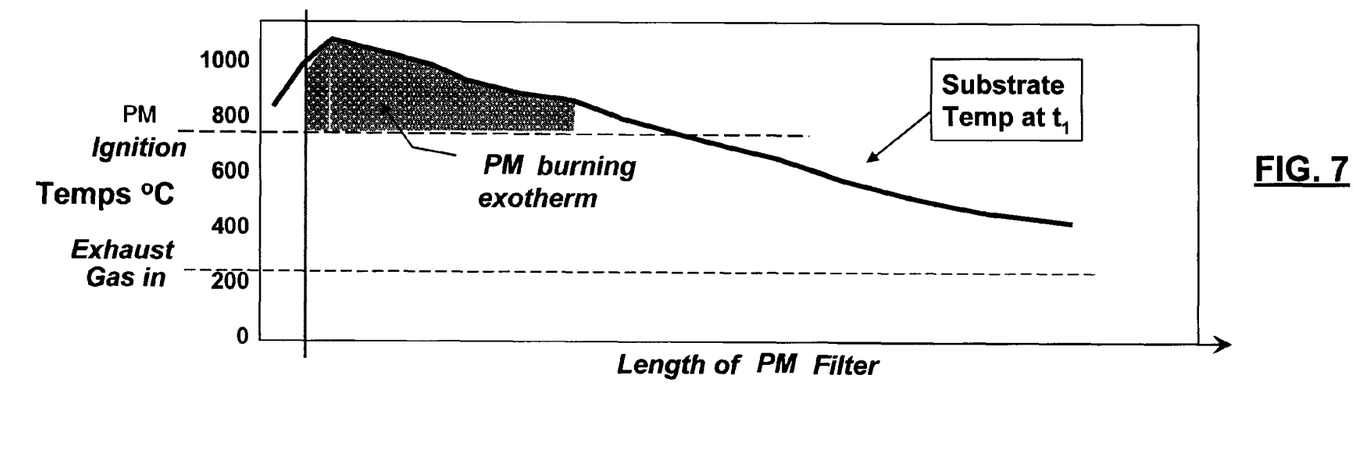
FIG. 7 is a side cross-sectional view of the PM filter of FIG. 6 and a graph of regeneration temperature during a first period after regeneration begins.
Figure 8:
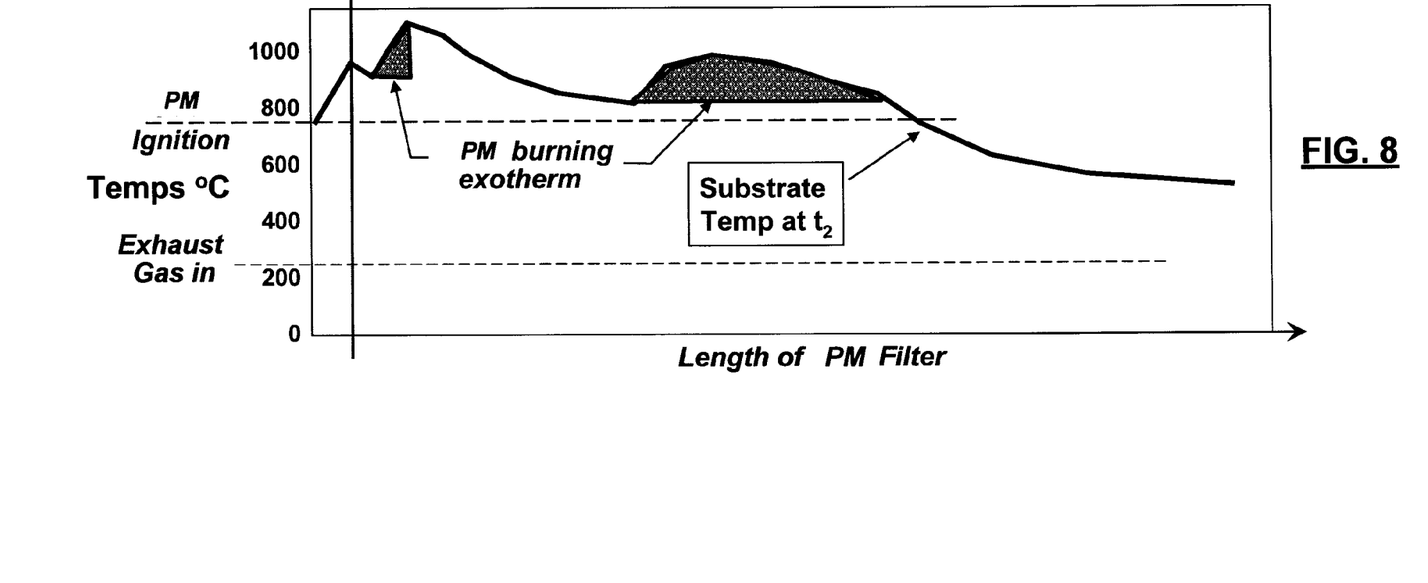
FIG. 8 is a side cross-sectional view of the PM filter of FIG. 6 and a graph of regeneration temperature during a second period after regeneration begins.
Figure 9:
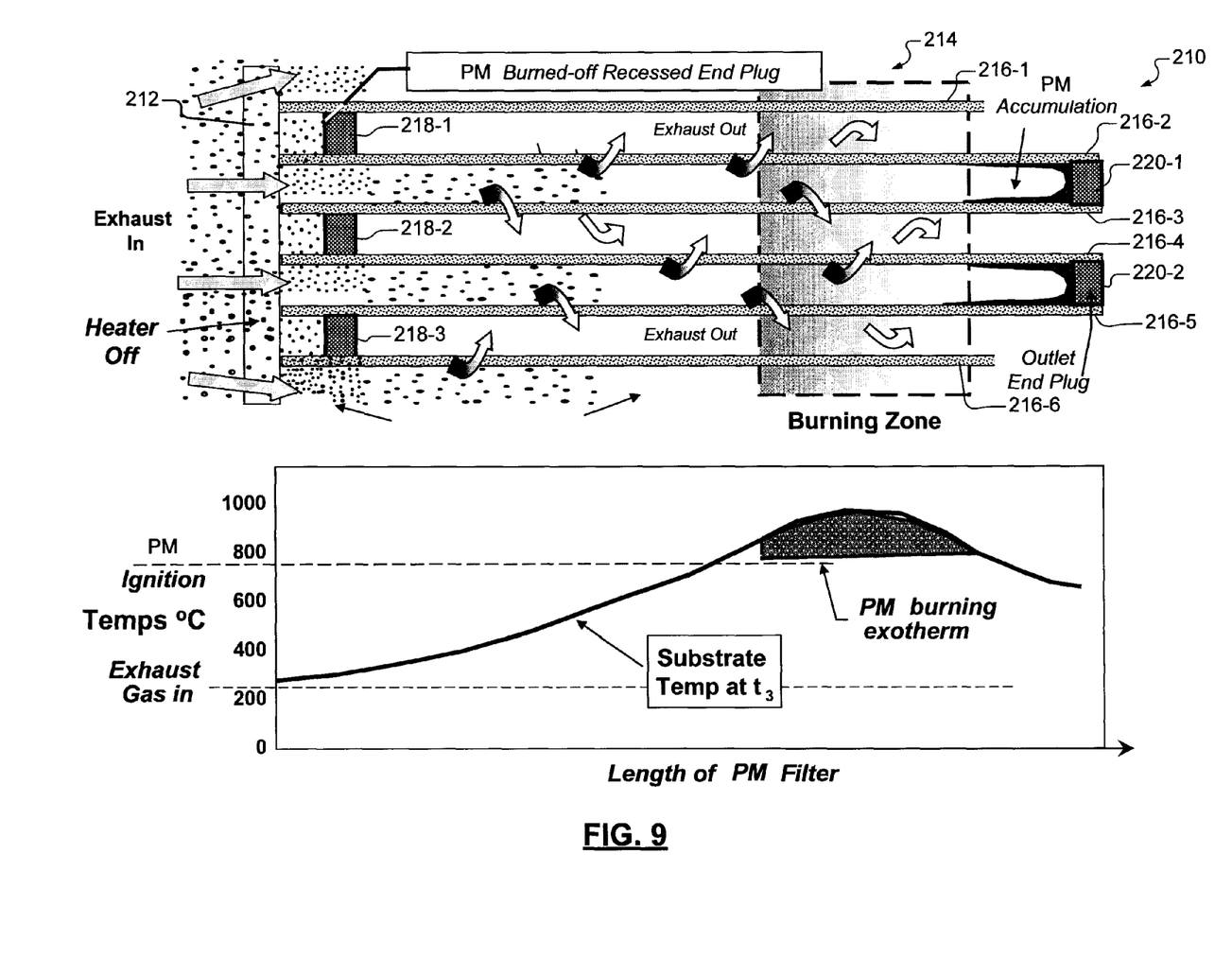
FIG. 9 is a side cross-sectional view of the PM filter of FIG. 6 and a graph of regeneration temperature during a third period after regeneration begins.

Referring now to FIGS. 7-9, regeneration within the PM filter system 210 is shown. In FIG. 7, when the heater 212 is turned on, PM adjacent to the heater 212 begins burning in a burning zone. The PM in the portions 219 contributes to the regeneration heat in the burning zone. As a result, less external heat needs to be applied by the heater for a given target regeneration temperature.

The substrate temperature in areas beyond the burning zone may be less than the PM ignition temperature. In FIG. 8, the burning zone moves and creates a wavefront along the length of the PM filter. Regeneration of the PM continues as long as the burning zone temperature is above the PM ignition temperature. In FIG. 9, since the burning zone continues to propagate down the length of the PM filter, the filter 214 is regenerated fully. The heater 212 may be turned off before regeneration completes.

Benefits of the proposed system and method include improved regeneration robustness to engine operating conditions. There is also the potential for reduced heating requirements of the heater since the PM accumulated in the recessed inlet end plugs of the outlet channels can be used to increase regeneration heat while external heat from the heater can be reduced. By reducing the heat from the external heater, the durability of the PM filter may tend to increase.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system comprising:
    a particulate matter (PM) filter comprising:
        filter walls having inlet ends and outlet ends, wherein first adjacent pairs of said filter walls define inlet channels, and wherein second adjacent pairs of said filter walls define outlet channels;
        outlet end plugs arranged in said inlet channels adjacent to said outlet ends; and
        inlet end plugs arranged in said outlet channels and spaced a predetermined distance downstream from said inlet ends;
    a heater that is arranged adjacent to said inlet ends of said filter walls; and
    a control module that estimates a localized PM exothermic heat at said inlet ends based on said predetermined distance and selectively activates said heater to regenerate said PM filter based on said localized PM exothermic heat.

2. The system of claim 1 wherein exhaust flows into said inlet channels through said filter walls of said inlet channels to said outlet channels and wherein exhaust flows into portions of said outlet channels between said inlet ends of said walls and said inlet end plugs.

3. The system of claim 2 wherein PM builds up in said portions during operation.

4. The system of claim 1 wherein said filter walls are parallel.

5. A method for removing particulate matter (PM) from a PM filter, comprising:
    providing filter walls having inlet ends and outlet ends;
    defining inlet channels using first adjacent pairs of said filter walls;
    defining outlet channels using second adjacent pairs of said filter walls;
    arranging outlet end plugs in said inlet channels adjacent to said outlet ends;
    recessing inlet end plugs in said outlet channels to be spaced a predetermined distance downstream from said inlet ends;
    using a heater that is arranged adjacent to said inlet ends of said filter walls to heat said PM filter;
    selectively activating said heater to regenerate said PM filter via a control module; and
    selecting said predetermined distance based on a reduction in wall area available for transitioning exhaust gas from said inlet channels to said outlet channels.

6. The method of claim 5 wherein exhaust flows into said inlet channels and through said filter walls of said inlet channels to said outlet channels.

7. The method of claim 5 wherein exhaust flows into portions of said outlet channels between said inlet ends of said walls and said inlet end plugs.

8. The method of claim 7 further comprising:
    allowing PM to build up in said portions during operation; and
    burning said PM during regeneration to increase heat.

9. The method of claim 5 wherein said filter walls are parallel.

10. A system comprising:
    a particulate matter (PM) filter comprising:
        filter walls having inlet ends and outlet ends, wherein first adjacent pairs of said filter walls define inlet channels, and wherein second adjacent pairs of said filter walls define outlet channels;
        outlet end plugs arranged in said inlet channels adjacent to said outlet ends; and
        inlet end plugs recessed a predetermined distance in said outlet channels,
        wherein exhaust flows into portions of said outlet channels between said inlet ends of said filter walls and said inlet end plugs, and
        wherein PM builds up in said portions during operation;
    a heater that is arranged adjacent to said inlet ends of said filter walls; and
    a control module that selectively activates said heater to regenerate said PM filter based on said predetermined distance.

11. The system of claim 10 wherein said exhaust flows into said inlet channels, through said filter walls of said inlet channels to said outlet channels.

12. The system of claim 10 wherein said filter walls are parallel.

13. The method of claim 5 wherein said predetermined distance is less than or equal to a predetermined limit for transitioning exhaust gas from said inlet channels to said outlet channels.

14. The system of claim 1 wherein the control module estimates an exhaust heat and selectively activates said heater to regenerate said PM filter based on said exhaust heat.

15. The method of claim 5 further comprising:
    estimating a localized PM exothermic heat at said inlet ends based on said predetermined distance;
    estimating an exhaust heat; and
    selectively activating said heater based on said localized PM exothermic heat and said exhaust heat.

16. The system of claim 10 wherein the control module reduces heat of said heater based on said predetermined distance.

* * * * *